US009261897B2

(12) United States Patent
Kim et al.

(10) Patent No.: US 9,261,897 B2
(45) Date of Patent: Feb. 16, 2016

(54) SCALABLE, COMMON REFERENCE-CLOCKING ARCHITECTURE USING A SEPARATE, SINGLE CLOCK SOURCE FOR BLADE AND RACK SERVERS

(75) Inventors: Inho Kim, Mountain View, CA (US); Choupin Huang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 13/994,282

(22) PCT Filed: Mar. 7, 2012

(86) PCT No.: PCT/US2012/028106
§ 371 (c)(1),
(2), (4) Date: Jun. 14, 2013

(87) PCT Pub. No.: WO2013/133826
PCT Pub. Date: Sep. 12, 2013

(65) Prior Publication Data
US 2013/0311817 A1 Nov. 21, 2013

(51) Int. Cl.
*G06F 1/04* (2006.01)
*G06F 1/10* (2006.01)
*G06D 1/12* (2006.01)
*G06F 1/12* (2006.01)

(52) U.S. Cl.
CPC .. *G06F 1/04* (2013.01); *G06F 1/10* (2013.01); *G06F 1/12* (2013.01)

(58) Field of Classification Search
CPC ................ G06F 1/04; G06F 1/10; G06F 1/12
See application file for complete search history.

(56) References Cited

U.S. PATENT DOCUMENTS

| 7,480,303 | B1 | 1/2009 | Ngai |
| 2004/0176920 | A1 | 9/2004 | Monfared et al. |
| 2006/0036831 | A1* | 2/2006 | Karashima et al. ........... 711/206 |
| 2007/0294561 | A1 | 12/2007 | Baker et al. |
| 2010/0315135 | A1 | 12/2010 | Lai et al. |

(Continued)

FOREIGN PATENT DOCUMENTS

WO 2013/133826 A1 9/2013

OTHER PUBLICATIONS

International Search Report and Written Opinion received for PCT Application No. PCT/US2012/028106, mailed on Nov. 14, 2012, 11 pages.

(Continued)

*Primary Examiner* — Stefan Stoynov
(74) *Attorney, Agent, or Firm* — Law Office of R. Alan Burnett, P.S

(57) ABSTRACT

Scalable, common reference-clocking architecture and method for blade and rack servers. A common reference clock source is configured to provide synchronized clock input signals to a plurality of blades in a blade server or servers in a rack server. The reference clock signals are then used for clock operations related to serial interconnect links between blades and/or servers, such as QuickPath Interconnect (QPI) links or PCIe links. The serial interconnect links may be routed via electrical or optical cables between blades or servers. The common reference clock input and inter-blade or inter-server interconnect scheme is scalable, such that the plurality of blades or servers can be linked together in communication. Moreover, when QPI links are used, coherent memory transactions across blades or servers are provided, enabling fine grained parallelism to be used for parallel processing applications.

19 Claims, 12 Drawing Sheets

(56) References Cited

U.S. PATENT DOCUMENTS

| | | | |
|---|---|---|---|
| 2011/0001620 A1 | 1/2011 | Copeland et al. | |
| 2011/0016201 A1 | 1/2011 | Ishiki et al. | |
| 2013/0024645 A1* | 1/2013 | Cheriton et al. | 711/206 |

OTHER PUBLICATIONS

Maddox et al., "Weaving High Performance Multiprocessor Fabric", Architectural insights into the Intel® QuickPath Interconnect', Version 1.0, Jul. 2009, 327 pages.

International Preliminary Report on Patentability and Written Opinion received for PCT Patent Application No. PCT/US/2012/028106, mailed on Sep. 18, 2014, 8 Pages.

Office Action received for Australia Patent Application No. 2012372800, mailed on May 14, 2015, 4 pages.

Office Action received for Korean Patent Application No. 2014-7025015, mailed on Jun. 12, 2015, 3 pages of English Translation and 4 pages of Korean Office Action.

* cited by examiner

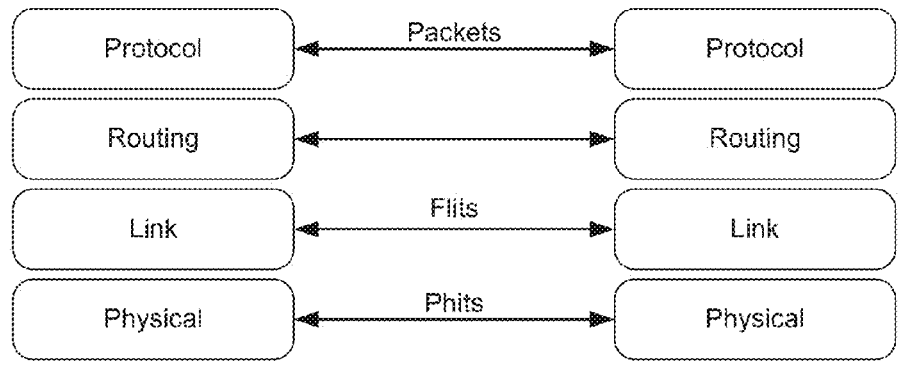
*Fig. 1*
*Fig. 2*
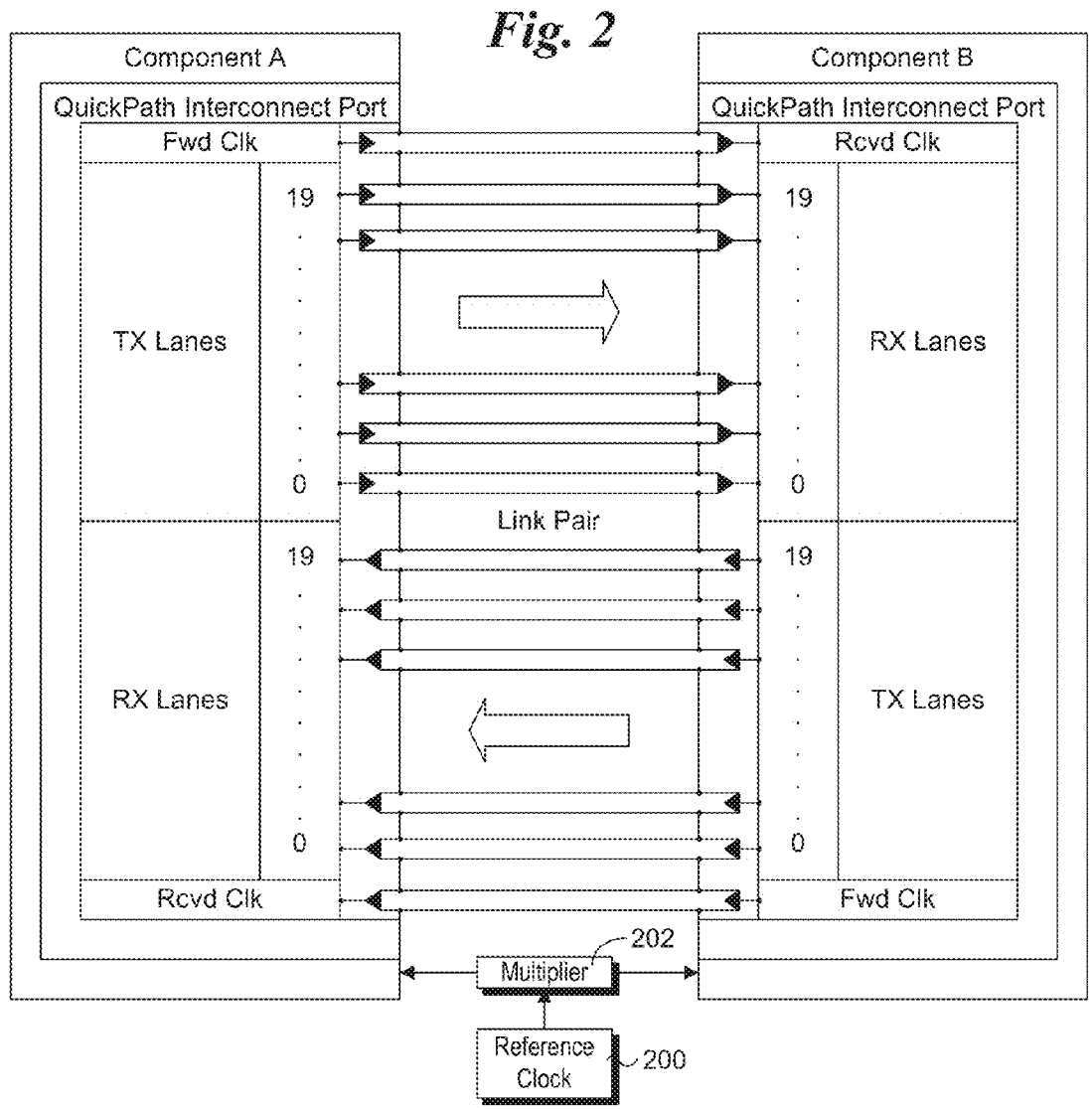

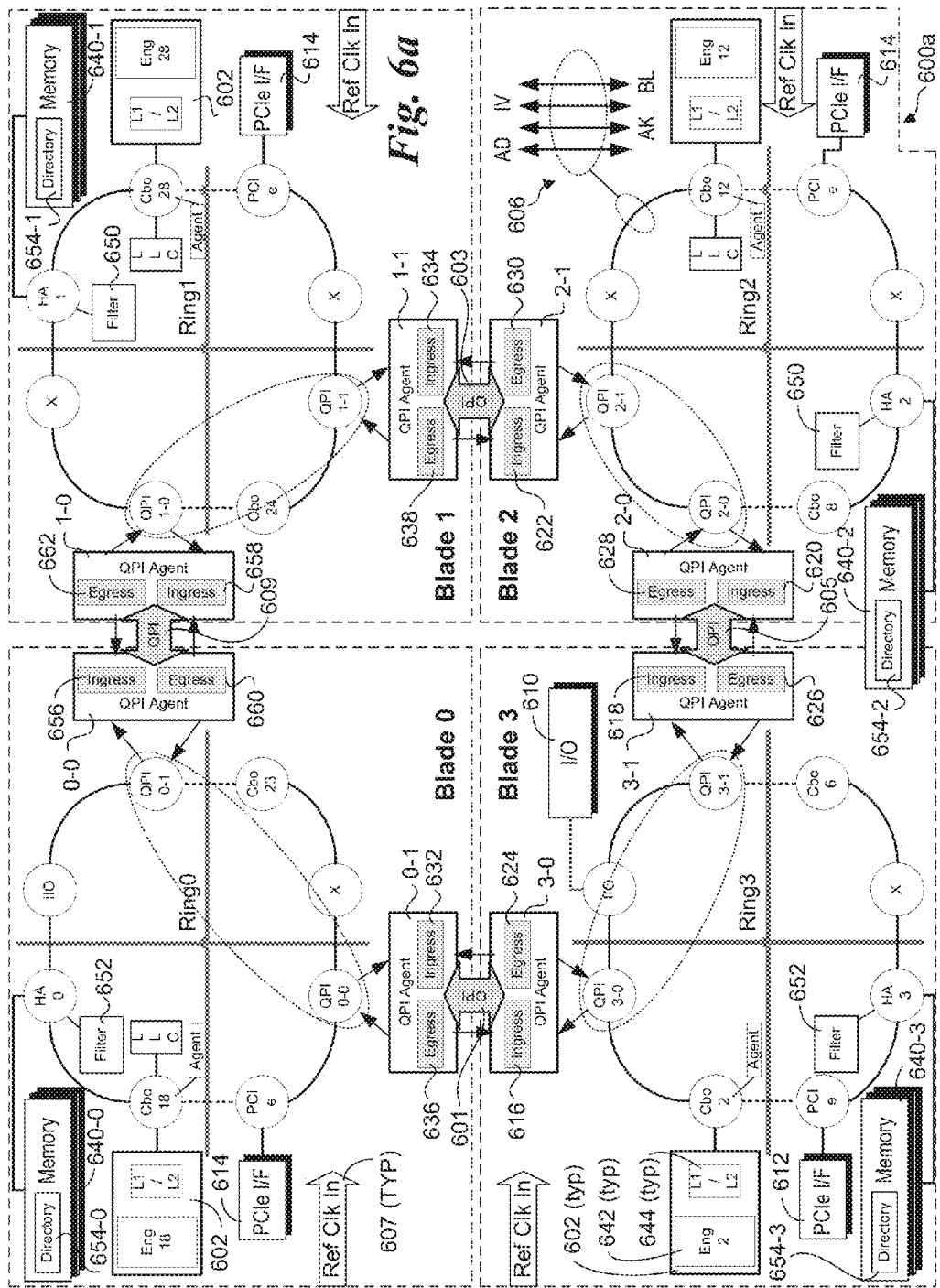

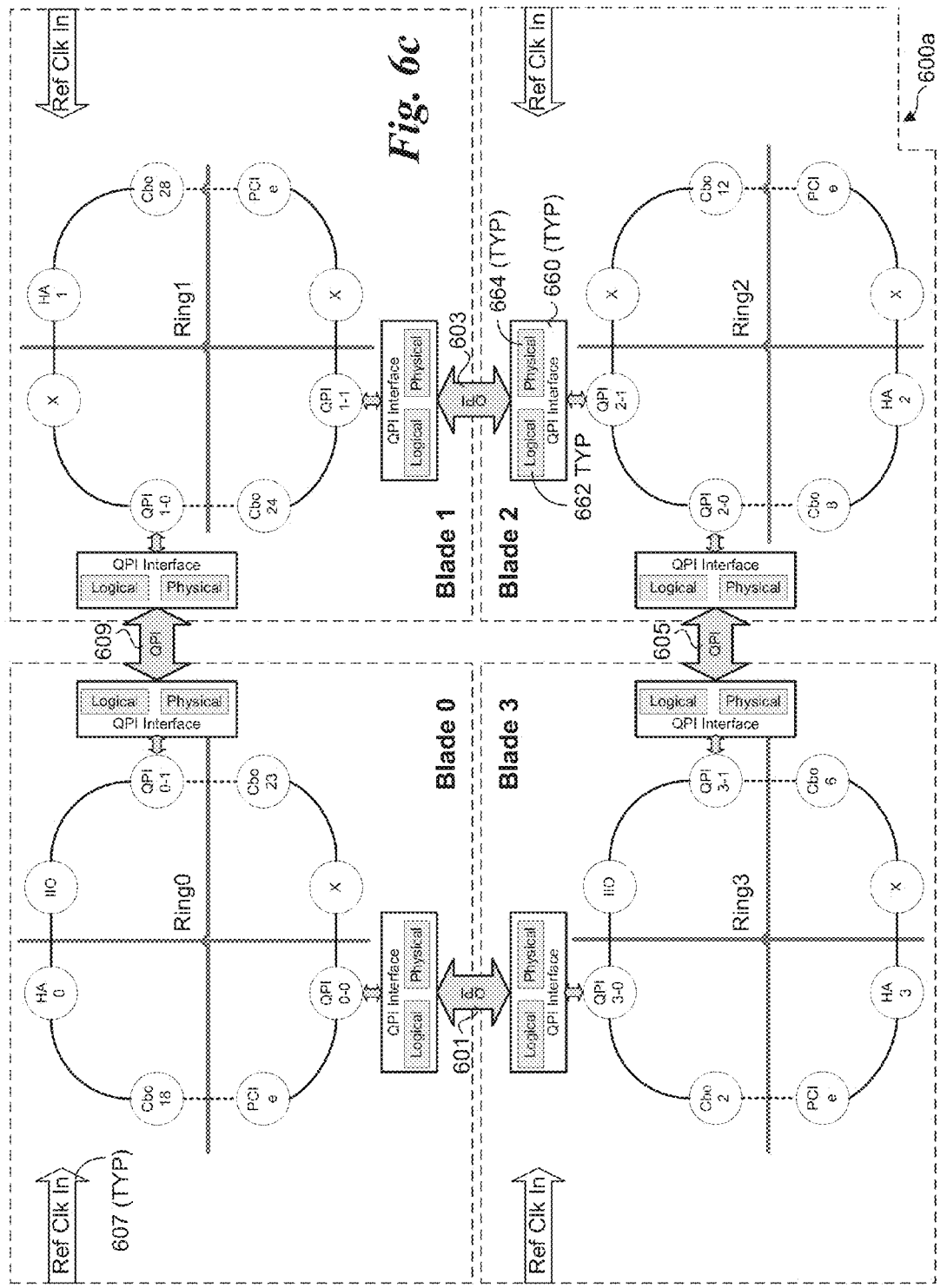

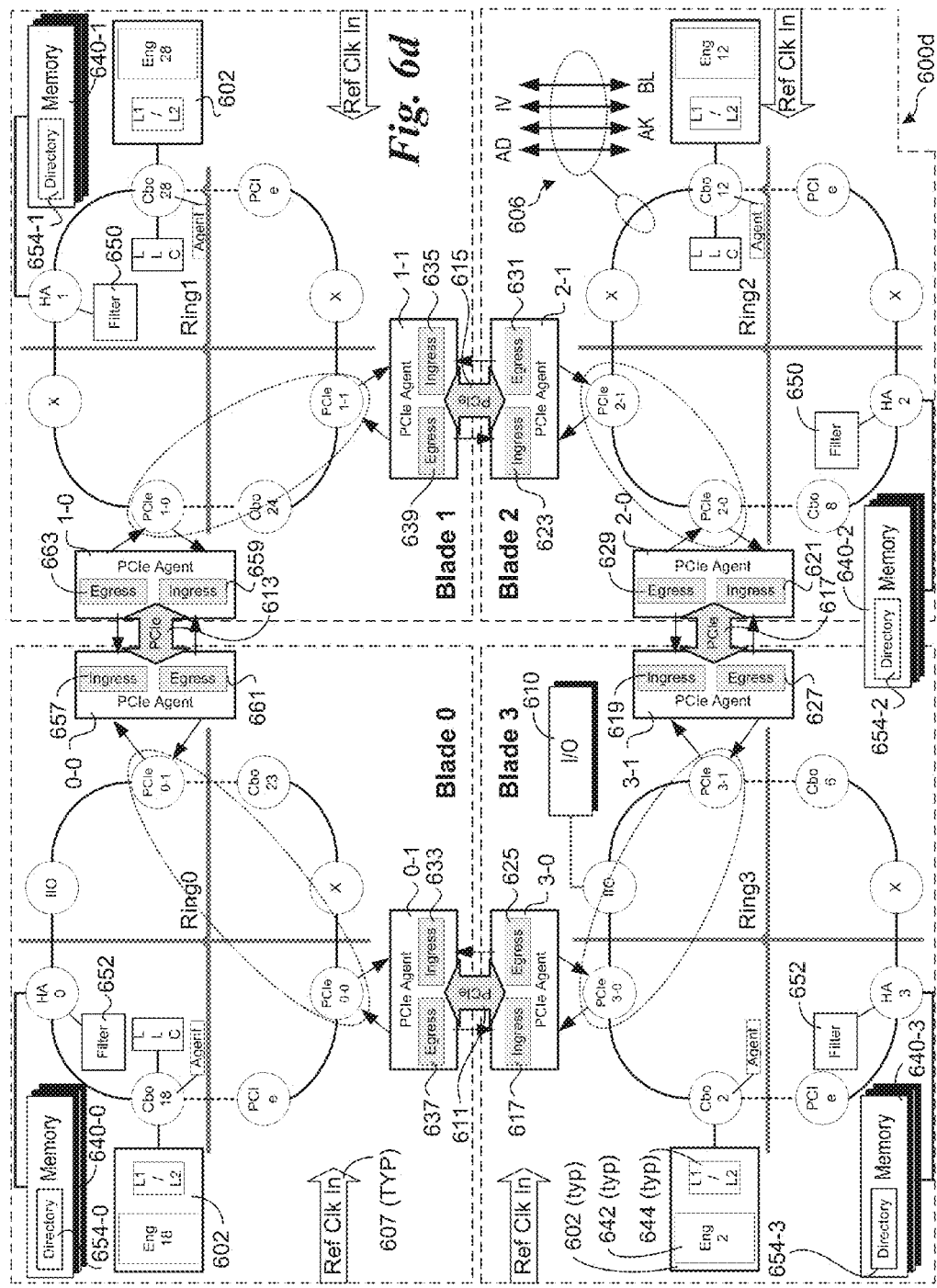

SCALABLE, COMMON REFERENCE-CLOCKING ARCHITECTURE USING A SEPARATE, SINGLE CLOCK SOURCE FOR BLADE AND RACK SERVERS

GOVERNMENT LICENSE RIGHTS

This invention was made with Government support under contract number H98230-10-9-0021 awarded by the Department of Defense. The Government has certain rights in this invention.

FIELD OF THE INVENTION

The field of invention relates generally to computer systems and, more specifically but not exclusively relates to common reference clock implementations for supporting communication links between server blades and rack servers.

BACKGROUND INFORMATION

There is an ever increasing number of computational and modeling problems that are being solved by parallel computing techniques. Parallel computing is a form of computation in which many calculations are carried out simultaneously using multiple processing resources, operating on the principle that large problems can often be divided into smaller ones, which are then solved concurrently ("in parallel"). This is typically accomplished by breaking the problem into independent parts so that each processing element can execute its part of the algorithm simultaneously with the others. The processing elements can be diverse and include resources such as a single computer with multiple processors, networked and/or clustered computers, specialized hardware, or any combination of the above.

There are various hardware/system architectures employed for most parallel computing tasks, including Symmetric Multiprocessing, multi-core processors, massively-parallel computer systems, and network-based architectures employing multiple locally clustered or geographically dispersed computers. Symmetric Multiprocessing (SMP) involves a multiprocessor computer hardware architecture where two or more identical processors are connected to a single shared main memory and are controlled by a single OS instance. Many of today's multiprocessor systems employ an SMP architecture. In the case of multi-core processors, control of memory accesses to the processor cores and associated cache levels are managed in a manner similar to SMP, with each core treated as a separate processor. Massively-parallel computer system architectures are often employed by supercomputers. These systems may employ an array of processors and/or multiple processor blades or servers with physically separate memory resources. Network-based architectures typically employ either a local cluster of computers or servers, or a network of geographically dispersed computers (also called distributive computing). For example, a computer cluster may be implemented via a blade server or rack server having blades or modules interconnected via network connections. Meanwhile, 100's, 1000's or even greater numbers of geographically dispersed computers may be employed to perform specialized tasks in parallel, such as solving problems using a MapReduce framework.

One of the key aspects of parallel processing architectures is data coherency, which is necessary to ensure that during ongoing operations the multiple processing elements are accessing valid copies of data objects. For SMP architectures and multi-core processors, data coherency is typically implemented via memory coherency schemes, such as using the well-known MESI (Mutual Exclusive, Shared, Invalid) memory coherency protocol or similar protocols. There are also techniques for assuring data coherency for distributive architectures, at a coarser level of granularity than under SMP or multi-core processor systems.

Another key aspect of parallel processing is scalability. Generally, the performance scalability of a given architecture is a non-linear function as relates to the number of processing elements, due in large part to data access bottlenecks and data transfer latencies. The fastest architectures (in terms of data access) employ System on a Chip (SoC) or Chip Multi Processor (CMP) configurations with multiple processor cores, such as Intel® Corporation's 48-core Single Chip Computer (SCC). The data access speed is facilitated in large part due to the use of a very high speed interconnects and protocols that supports coherent memory transactions (such as Intel's QuickPath® Interconnect or QPI). Although SoCs and CMPs support very fast coherent memory transactions, their scalability in terms of processing elements is fundamentally limited to the number of cores they employ.

At the opposite end of the scale is distributive computing architectures. This approach has (theoretically) infinite scalability (in terms of the number of processing elements), but has inherent latencies that functionally limit the practical data granularity that can be used for performing parallel operations. As a result, the level of parallelism in distributive computing architectures is relatively low. In between is massively-parallel architectures and clustered blade/server architectures. These have inherent processor scalability (within practical limits due to space and heat considerations), and generally provide high performance. However, the performance of data access and parallelism across blades and/or servers using networked links is significantly less than provided by SoCs and CMPs, while availability of supercomputers is cost-prohibitive for most users.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 shows the layers of the QPI protocol stack;

FIG. 2 is a schematic diagram illustrating the structure of a full width QPI link;

FIG. 6a is a schematic block diagram of a variation of the system architecture of FIG. 6 employing a respective QPI node at each QPI interface;

FIG. 6c is a schematic block diagram illustrating further details of the system architecture in FIG. 6a;

FIG. 6d is a schematic block diagram of a system architecture to support communication between server blades or rack servers using PCIe links;

DETAILED DESCRIPTION

Figure 3:
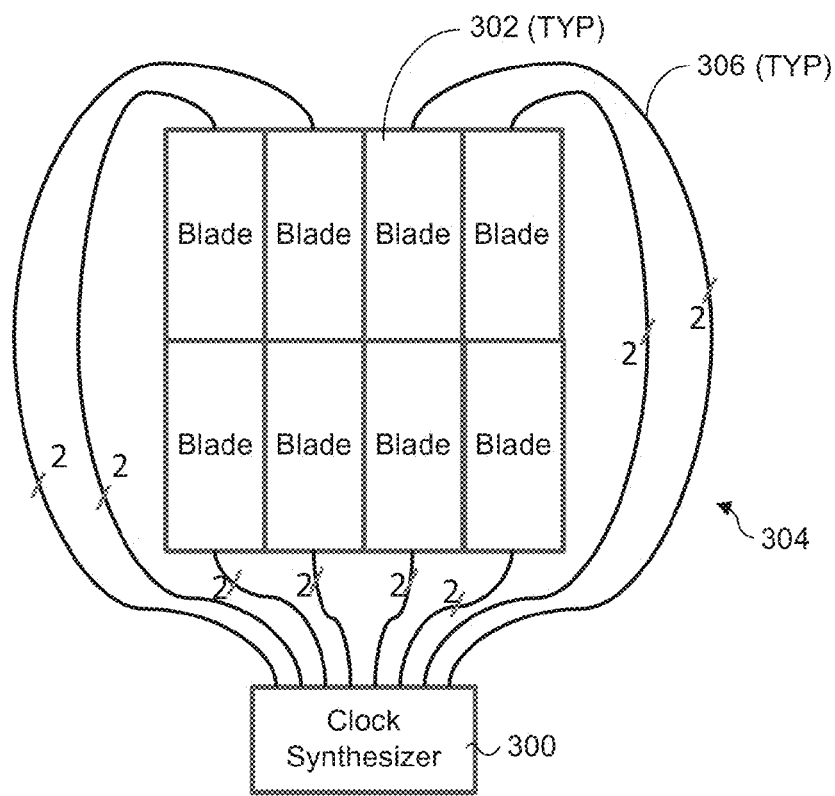
FIG. 3 illustrates one embodiment of a common reference clock scheme to support serial interconnect links between blades in a blade server.

Embodiments of scalable, common reference-clocking architectures and methods for blade and rack servers are described herein. In the following description, numerous specific details are set forth (such as use of QPI and PCIe links based on forwarded-clocking and embedded-clocking architecture, respectively) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments disclosed herein, techniques are provided to facilitate scaling of cluster-type distributed processing environments, such as blade servers and rack servers, while supporting fine grained parallelism. This advancement is facilitated, in part, by extending an intra-processor cache coherency protocol and link architecture to support very high-speed coherent memory transactions of memory resources that are distributed among multiple blade server and/or rack server boards. In one embodiment, the cache coherency protocol is the Intel Quick-Path® Interconnect (QPI protocol). In order to better understand how this may be implemented, the following brief overview of QPI is provided.

Overview of QuickPath Interconnect

QPI transactions are facilitated via packetized messages transported over a multi-layer protocol. As shown in FIG. 1, the layers include a Physical layer, a Link layer, a Routing layer, and a Protocol layer. At the Physical layer, data is exchanged in 20-bit phits (Physical Units) when employing the full width of 20 lanes shown in FIG. 2. Optionally, reduced lane widths may be used, such as 10 or 5 lanes. At the link layer phits are aggregated into 80-bit flits (flow control units). At the Protocol layer, messages are transferred between agents using a packet-based transport.

The Physical layer defines the physical structure of the interconnect and is responsible for dealing with details of operation of the signals on a particular link between two agents. This layer manages data transfer on the signal wires, including electrical levels, timing aspects, and logical issues involved in sending and receiving each bit of information across the parallel lanes. As shown in FIG. 2, the physical connectivity of each interconnect link is made up of twenty differential signal pairs plus a differential forwarded clock. Each port supports a link pair consisting of two uni-directional links to complete the connection between two components. This supports traffic in both directions simultaneously.

Components with QPI ports communicate using a pair of uni-directional point-to-point links, defined as a link pair, as shown in FIG. 2. Each port comprises a Transmit (Tx) link interface and a Receive (Rx) link interface. For the illustrated example, Component A has a Tx port that is connected to Component B Rx port. One uni-directional link transmits from Component A to Component B, and the other link transmits from Component B to Component A. The "transmit" link and "receive" link are defined with respect to a specific QPI agent. The Component A transmit link transmits data from Component A Tx port to Component B Rx port.

The second layer up the protocol stack is the Link layer, which is responsible for reliable data transmission and flow control. The Link layer also provides virtualization of the physical channel into multiple virtual channels and message classes. After the Physical layer initialization and training is completed, its logical sub-block works under the direction of the link layer, which is responsible for flow control. From this link operational point onwards, the logical sub-block communicates with the Link layer at a flit granularity (80 bits) and transfers flits across the link at a phit granularity (20 bits). A flit is composed of integral number of phits, where a phit is defined as the number of bits transmitted in one unit interval (UI). For instance, a full-width QPI link transmits and receives a complete flit using four phits. Each flit includes 72 bits of payload and 8 bits of CRC (Cyclic Redundancy Check).

The Routing layer is responsible for ensuring that messages are sent to their proper destinations, and provides the framework for directing packets through the interconnect fabric. If a message handed up from the Link layer is destined for an agent in another device, the Routing layer forwards it to the proper link to send it on. All messages destined for agents on the local device are passed up to the protocol layer.

The Protocol layer serves multiple functions. It manages cache coherence for the interface using a write-back protocol. It also has a set of rules for managing non-coherent messaging. Messages are transferred between agents at the Protocol level using packets. The Protocol layer manages delivery of messages across multiple links, involving multiple agents in multiple devices. The system's cache coherency across distributed caches and memory controllers is maintained by distributed agents that participate in coherent memory space transactions, subject to rules defined by the Protocol layer. The QPI coherency protocol supports both home snoop (described below in further detail) and source snoop behaviors.

Common Reference Clock for Serial Interconnect Links

As stated above, QPI employs a forwarded differential clock, as depicted in FIG. 2 by a Fwd Clk at a transmitting component and a Rcvd Clk at a receiving component. Although the clock signals are forwarded, there is a requirement that both sides of the link are synchronized with respect to a common reference clock. This is depicted in FIG. 2 as a reference clock 200 and a frequency multiplier 202, which is used to multiply the reference clock frequency to a higher frequency used by a QPI link. For example, in one embodiment the reference clock operates at 100 or 133 MHz, while the QPI link clock (Fwd Clk) rate is 2.4, 2.93, 3.2, or 4.0 GHz.

QPI was originally developed as an intra-processor interconnect for connecting processor cores and other functional blocks in SoC architectures. As a result, on SoC's the QPI ports have simple access to a common reference clock, since there is one or more reference clock signals (and corresponding multiplied clocking signals) available on the SoC die itself.

An additional aspect (when compared with many other interconnects) of QPI is that since the QPI protocol is layer-based, it is designed to support network-type functionality, such as routing messages between agents using an address-based scheme. Because QPI has inherent network-type functionality, there is no physical limitation to where a QPI port may be located, as long as other QPI link criteria are met. This includes appropriate signal pathways for supporting the QPI physical layer, which includes defined timing requirements. In particular, a common reference clock signal is required at both ends of a QPI link, including both internal links (e.g., internal to an SoC) and external QPI links (that is, links that connect to physically separate components).

In the context of a blade server, external QPI links between blades may be implemented using copper traces routed over a mid-plane or backplane. However, this scheme has limited scalability due to the common reference clock requirement and routing trace limitations. Since the reference clock timing requirements are very tight (e.g., the maximum time difference between the reference clock inputs at the opposing ends of a QPI link is very small), the length of the copper traces from a common reference clock source to the QPI port interfaces needs to be matched (within a substantial degree, depending on various parameters such as the reference clock frequency, link frequency, trace length, etc). From a practical standpoint, the number of blades or server boards that can be linked in communication via QPI links using the mid-plane or backplane scheme is limited, such as two blades or boards—once additional blades or boards are to be added, the routing complexity of the traces (as well as the number of traces and corresponding real estate required on the blades/boards and mid-plane or backplane) increases substantially. Thus, this approach is not a practical solution for scalability of QPI inter-blade or inter-board links in blade servers and rack servers.

In accordance with aspects of embodiments herein, techniques are disclosed for supporting greater scalability of QPI inter-blade and inter-board links in blade servers and rack servers. One aspect of the techniques relates to providing common reference clock signals at the QPI ports or interfaces.

Figure 4:
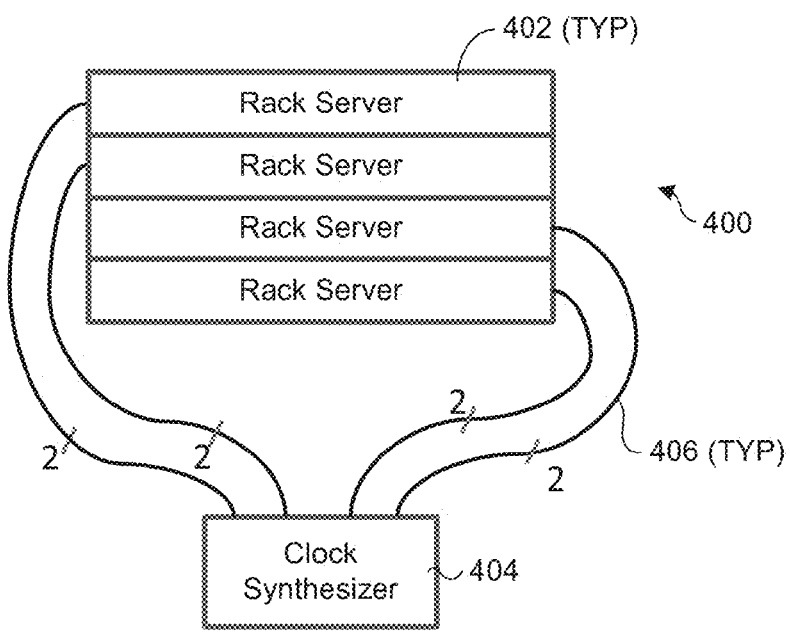
FIG. 4 illustrates one embodiment of a common reference clock scheme to support serial interconnect links between servers in rack servers.

FIGS. 3 and 4 show respective embodiments of common reference clock schemes to support serial interconnect links (e.g., QPI links) between blades in blade servers and servers in rack servers. As shown in FIG. 3, a clock synthesizer 300 has eight reference-clock outputs that are connected to a respective blade 302 in a blade server 304. Each clock signal comprises a differential signal that is carried over a two-wire (e.g., coaxial) cable 306. FIG. 4 depicts a common reference clock scheme for a rack server 400 including four servers 402. In this configuration, a clock synthesizer 404 supplies four reference clock signals to respective rack servers 402 via two-wire cables 406.

The routing of the cables 306 and 406 used to transmit the reference clock signals in FIGS. 3 and 4 are simplified, and are used to represent connections at a block level. As discussed above, the timing requirement of the reference clock signals is very tight. Accordingly, in one embodiment this is addressed using the same (i.e., substantially equal) length of cable from the clock synthesizer 300 or 404 to each of the blades 302 or servers 402. An alternative scheme is to combine a length of cable with a signal propagation delay element such that the signal propagation delay between the clock synthesizer and the blades 302 or servers 402 is substantially equal.

Figure 5:
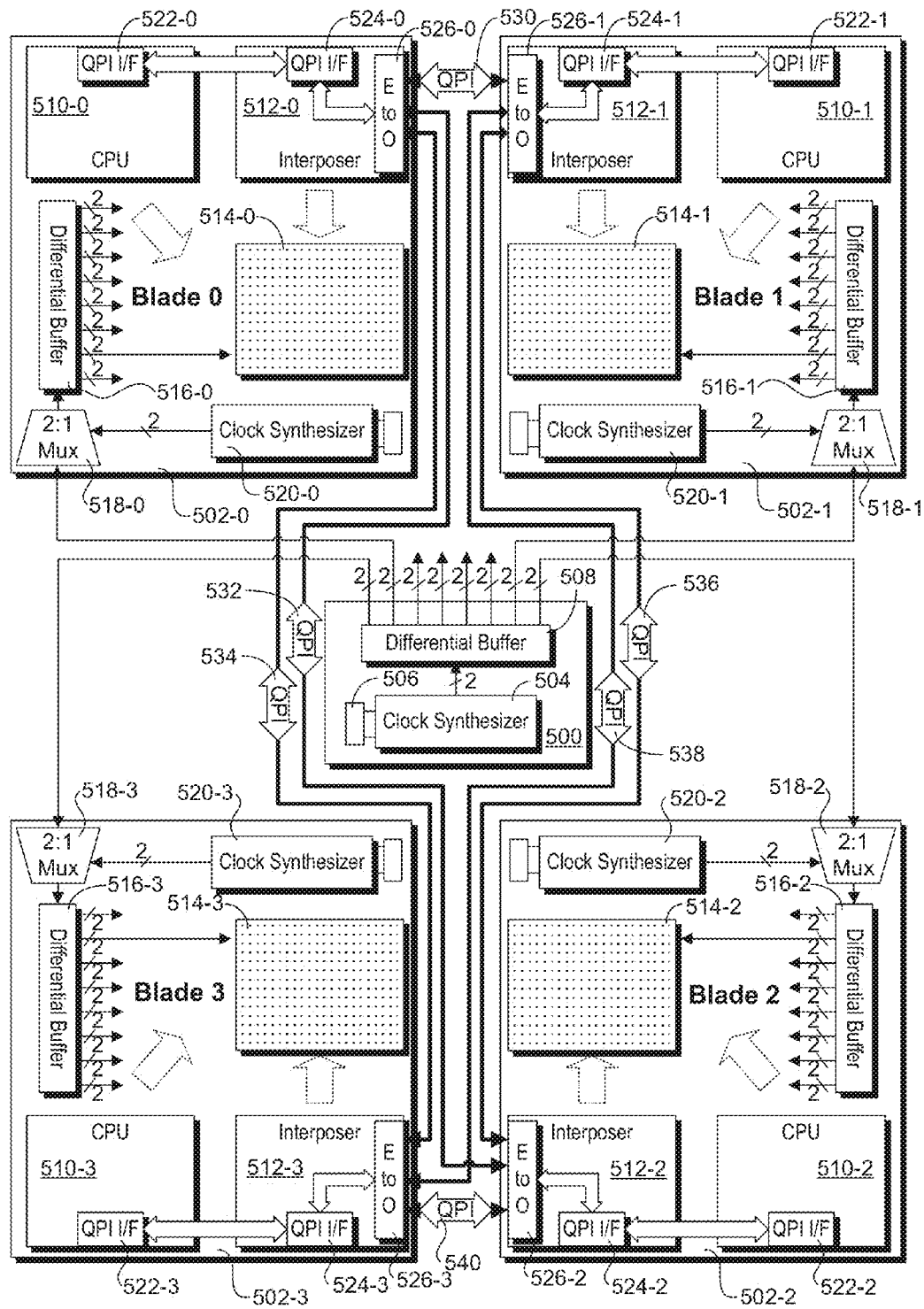
FIG. 5 is a schematic block diagram illustrating one embodiment of a QPI blade-to-blade interconnect implementation using a clock synthesizer board that supplies common reference clock signals to four server blades.

FIG. 5 shows details of one embodiment of a QPI blade-to-blade interconnect implementation using a clock synthesizer board 500 that supplies common reference clock signals to four blades 502-0, 502-1, 502-2, and 502-3 (also labeled Blade 0, Blade 1, Blade 2 and Blade 3). Clock synthesizer board 500 includes a clock synthesizer chip 504 coupled to a crystal 506 that provides a differential clock signal that is input into a differential buffer 508. In general, crystal 506 is used by clock synthesizer chip 504 to generate a differential clock signal at a frequency that is a function of the physical frequency of the crystal, which is very stable.

Clock synthesizer chip 504 may comprise one of various clock synthesizer chips commonly used for reference clock signal generation. In one embodiment, clock synthesizer chip 504 is compliant with the Intel's CK420BQ Clock Specification, and produces an output frequency of 100 MHz or 133 MHz. Depending on the number of differential clock output signal pairs generated by clock synthesizer chip 504, differential buffer 508 may or may not be used. For example, a clock synthesizer chip such as the Silego SLG84901 provides four differential CPU clock outputs. Accordingly, for a four board implementation, differential buffer 508 would not be needed. However, for implementations that provide common clock signals to more than the number of differential clock signal outputs provided by the clock synthesizer chip, a means for replicating the differential clock signal would be implemented. There are various types of differential buffers that may be used, such as a DB1900Z, 9 DB1200, DB800Q, etc. Clock synthesizer board 500 also includes an appropriate cable connector for each differential output signal, such as a coaxial connector for coaxial cables.

Each of blades 502-0, 502-1, 502-2 and 502-3 are similarly configured, as illustrated in FIG. 5, where like components share the same base reference number with different suffixes indicating the components are associated with each other (e.g., 5xx-0, 5xx-1, 5xx-2, 5xx-3). Accordingly, while the following description applies to blade 502-0, it will be understood that each of blades 502-1, 502-2, and 502-3 has similar components. In the illustrated embodiment, blade 502-0 includes a CPU 510-0, an interposer 512-0, a CPU socket 514-0, a differential buffer 516-0, a 2:1 multiplexer (mux) 518-0, and an onboard clock synthesizer chip 520-0 with an associated crystal. Differential buffer 516-0 is used to replicate the differential reference clock signal produced by clock synthesizer chip 520-0 or a received external reference clock signal from the clock synthesizer board 500, and to provide replicated reference clock signal to various blade components. These components may further modify the reference clock signals they receive via internal frequency multipliers, or otherwise such frequency multipliers may be implemented on blade 502-0 as one or more separate components (not shown).

Under conventional operation, the onboard clock synthesizer chips 520-0, 520-1, 520-2, and 520-3 would be used to provide a common reference clock signal to various components on respective blades 502-0, 502-1, 502-2, and 502-3. However, 2:1 muxes 518-0-518-3 enable the reference clock signal for the blades to be either supplied by an onboard clock synthesizer chip or via an external reference clock signal, such as generated by clock synthesizer board 500. Accordingly, when each of 2:1 muxes 518-0-518-3 is switched to employ an external reference clock signal supplied by clock synthesizer board 500, the components on each of blades 502-0-502-3 employ a common reference clock signal that is synchronized across the blades. Alternatively, in one embodiment the common reference clocks from clock synthesizer board 500 are directly provided to the differential buffers in each of blades 502-0-502-3, thus removing the need for a 2:1 muxes and on-board clock synthesizers. Accordingly, in this embodiment 2:1 muxes 518-0-518-3 and on-board clock synthesizers 520-0-520-3 are not present.

Each of CPU 510-0 and interposer 512-0 is depicted as including a respective QPI interface (I/F) 522-0 and 524-0. In addition, interposer 512-0 is shown including an electrical-to-optical (E to O) interface 526-0, which is implemented in one embodiment. In an alternative configuration, electrical-to-optical interface 526-0 is replaced with an electrical connector configured to be coupled to a wired interconnect cable rather than an optical cable.

Upon assembly, interposer 512-0 would be interposed between CPU 510-0 and CPU socket 514-0. Under a normal installation that doesn't employ an interposer, an array of pins on the underside of CPU 510-0 would be inserted into a similar array of mating connector members (e.g., pin receptacles) on socket 514-0. A portion of the functionality of interposer 512-0 is to facilitate the same connections in a stacked configuration. Accordingly, the top surface of interposer 512-0 has an array of pin receptacles that are electrically coupled to an array of pins on the underside of the interposer. Accordingly, when interposer 512-0 is installed in CPU socket 514-0 and CPU 510-0 is installed in interposer 512-0, the resulting electrical connections are similar to if CPU 510-0 was installed into CPU socket 514-0 directly. In an alternative configuration, an interposer or circuit board/substrate having similar functionality may be coupled to a blade or server board apart from a CPU socket, wherein applicable interposer circuitry is electrically connected to QPI interface 522-0 via electrical traces routed on the board.

Interposer 512-0 is further configured to provide an interface with QPI interface 522-0 of CPU 510-0 and to effectively provide an optical or wired cable interface with QPI interface 522-0. QPI interface 522-0 is representative of two aspects of a QPI interface for CPU 510-0. The first corresponds to logic and circuitry embedded in CPU 510-0 corresponding to a QPI interface block, as described in further detail below. The second aspect is a set of pins comprising a QPI external interface to support QPI physical layer signaling to components external to CPU 510-0. In a similar manner, QPI interface 524-0 on interposer 512-0 is representative of a set of receptacles that are configured to mate with matching pins on CPU 510-0 corresponding to the QPI external interface. QPI interface 524-0 may further comprise additional aspects, such as buffers and associated logic and/or signal conditioning, for facilitating QPI interconnect functionality, as further detailed below.

QPI electrical signals are routed from QPI interface 524-0 to electrical-to-optical interface 526-0 on interposer 512-0. In one embodiment, interposer 512-0 comprises a multi-layer circuit board, and the signals are routed via corresponding wire traces embedded in the circuit board. Other types of substrates may also be used. Electrical-to-optical interface 526-0 is configured to convert electric signals received from QPI interface 524-0 into optical signals for outbound transmission over an optical cable coupled to electrical-to-optical interface 526-0, and to convert inbound optical signals received over the optical cable (or separate optical cable, depending on the cable implementation) to electrical signals. In one embodiment, optical signals and associated optical cables are used rather than electrical signals and electrical cables to reduce EMI (electro-magnetic interference) effects. It is noted that electrical-to-optical interface 526-0 further includes appropriate optical connectors configured to connect to the optical cables.

As stated above, in another embodiment electrical signals and cabling are used for the links between blades rather than optical signals and cabling. Accordingly, corresponding QPI link cables and interfaces including appropriate connectors for connecting to corresponding electrical cables are mounted on interposer 512-0 in this embodiment (not shown). In one embodiment, twinax cables are used.

FIG. 5 further depicts a plurality of QPI cables coupled between interposers 512-0-512-3 on blades 502-0-502-3. These include QPI cables 530, 532, 534, 536, 538, and 540, which are illustrative of both optical and electrical cables. FIG. 5 depicts an exemplary configuration in which each of blades 502-0-502-3 is linked in communication with each other blade via a QPI link. However, other configurations may be employed as well. Generally, a given blade participating in parallel processing operations may be linked to one or more other participating blades using corresponding QPI links. In one embodiment, a plurality of blades is linked in a daisy chain manner, with each blade connected to two other blades via respective QPI links. In this manner, each blade is enabled to communicate with each other blade via QPI links comprising one or more hops. If the daisy chain is closed, further performance may be achieved through a reduction in the number of hops for various transactions.

In addition to employing and routing cables between interposers, other configurations may be employed. In one embodiment, a segment of cable is routed from an interposer to a cable connecter or set of connectors that is mounted external to a blade or server or otherwise supports an external connection with the blade or server, when the blade or server is installed in a corresponding blade server chassis or server rack. In another embodiment that does not employ an interposer, signal traces are embedded in the main board of a blade or server from pinouts in the socket corresponding to the set of QPI interface pins in the CPU; and linked to either a connector that is internal to the blade or server or to an external connector (or otherwise a combination of the two). As an option, an electrical-to-optical interface component may be operatively coupled between the signal traces and an applicable optical cable connector or set of connectors to which an optical cable or cables is coupled upon installation.

Exemplary Blade and System Architecture

Figure 6:
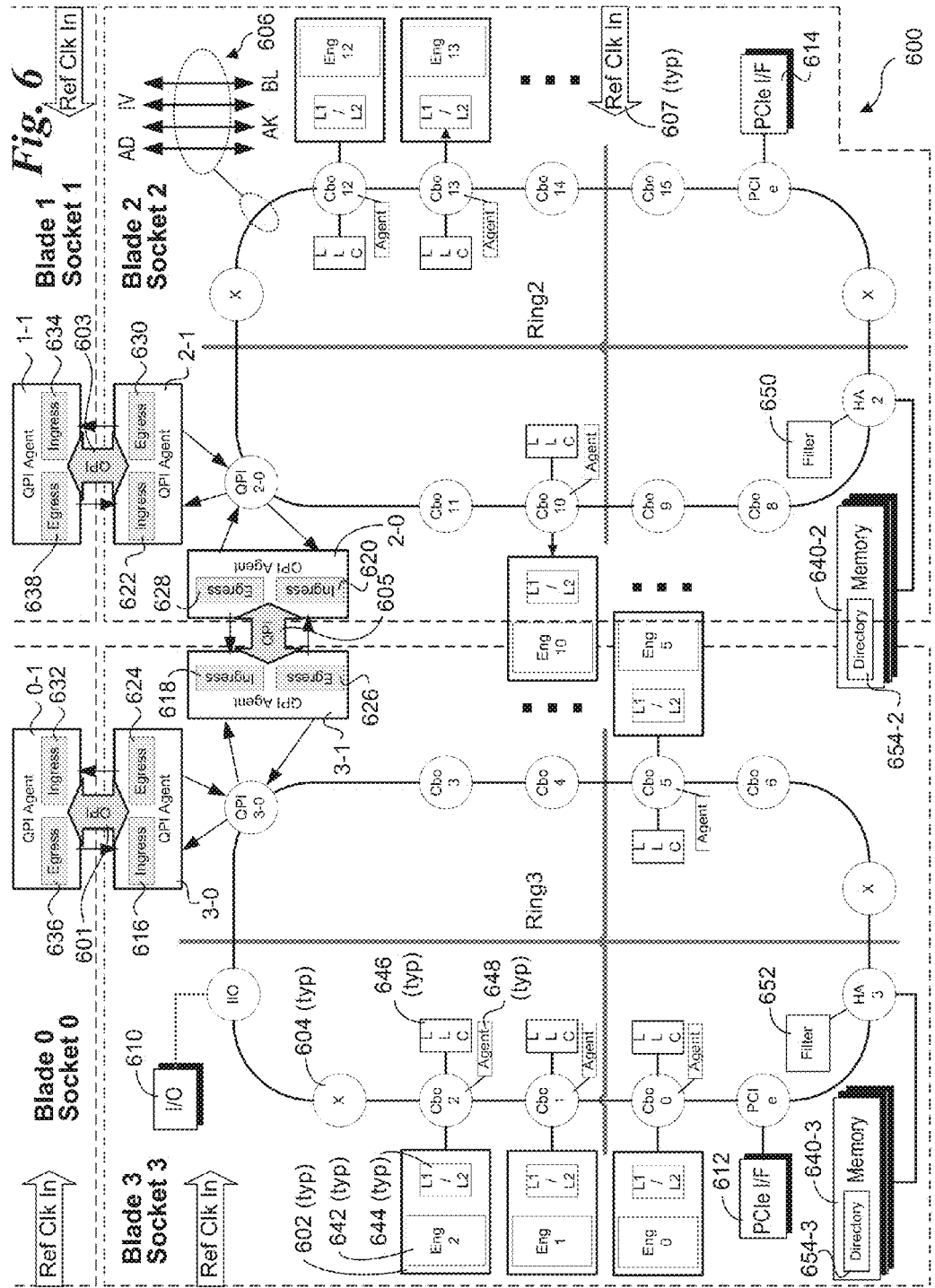
FIG. 6 is a schematic block diagram of a system architecture to support coherent memory transactions across server blades or rack servers using QPI links between the server blades or rack servers.

FIG. 6 shows a system architecture 600 that may be configured to support coherent memory transactions across server blades or rack servers using QPI links between the server blades or rack servers. System architecture 600 is illustrative of an advanced system architecture including SoC processors (CPU's) supporting multiple processor cores 602, each coupled to a respective node 604 on a ring interconnect, labeled and referred to herein as Ring2 and Ring3 (corresponding to CPU's installed in CPU sockets of blades 2 and 3, respectfully). For simplicity, the nodes for each of the Ring2 and Ring3 interconnects are shown being connected with a single line. As shown in detail 606, in one embodiment each of these ring interconnects includes four separate sets of "wires" or electronic paths connecting each node, thus forming four rings for each of Ring2 and Ring3. In actual practice, there are multiple physical electronic paths corresponding to each wire that is illustrated. It will be understood by those skilled in the art that the use of a single line to show connections herein is for simplicity and clarity, as each particular connection may employ one or more electronic paths.

In the context of system architecture 600, a cache coherency scheme may be implemented by using independent message classes. Under one embodiment of a ring interconnect architecture, independent message classes may be implemented by employing respective wires for each message class. For example, in the aforementioned embodiment, each of Ring2 and Ring3 include four ring paths or wires, labeled and referred to herein as AD, AK, IV, and BL. Accordingly, since the messages are sent over separate physical interconnect paths, they are independent of one another from a transmission point of view.

In one embodiment, data is passed between nodes in a cyclical manner. For example, for each real or logical clock cycle (which may span one or more actual real clock cycles), data is advanced from one node to an adjacent node in the ring. In one embodiment, various signals and data may travel in both a clockwise and counterclockwise direction around the ring. In general, the nodes in Ring2 and Ring3 may comprise buffered or unbuffered nodes. In one embodiment, at least some of the nodes in Ring2 and Ring3 are unbuffered.

Each of Ring2 and Ring3 includes a plurality of nodes 604. Each node labeled Cbo n (where n is a number) is a node corresponding to a processor core sharing the same number n (as identified by the core's engine number n). There are also other types of nodes shown in system architecture 600 including QPI nodes 3-0 and 2-0, an IIO node, and PCIe nodes. In the illustrated embodiment, QPI node 3-0 is operatively coupled to two QPI Agents 3-0 and 3-1, and QPI node 2-0 coupled to QPI Agents 2-0 and 2-1. The IIO node is operatively coupled to an Input/Output interface 610. Similarly, PCIe nodes are operatively coupled to PCIe interfaces 612 and 614. Further shown are a number of nodes marked with an "X"; these nodes are used for timing purposes. It is noted that the QPI, IIO, PCIe and X nodes are merely exemplary of one implementation architecture, whereas other architectures may have more or less of each type of node or none at all. Moreover, other types of nodes (not shown) may also be implemented.

Each of the QPI agents 3-0, 3-1, 2-0, and 2-1 includes circuitry and logic for facilitating transfer of QPI packets between the QPI agents and the QPI nodes they are coupled to. This circuitry includes ingress and egress buffers, which are depicted as ingress buffers 616, 618, 620, and 622, and egress buffers 624, 626, 628, and 630.

Figure 6B:
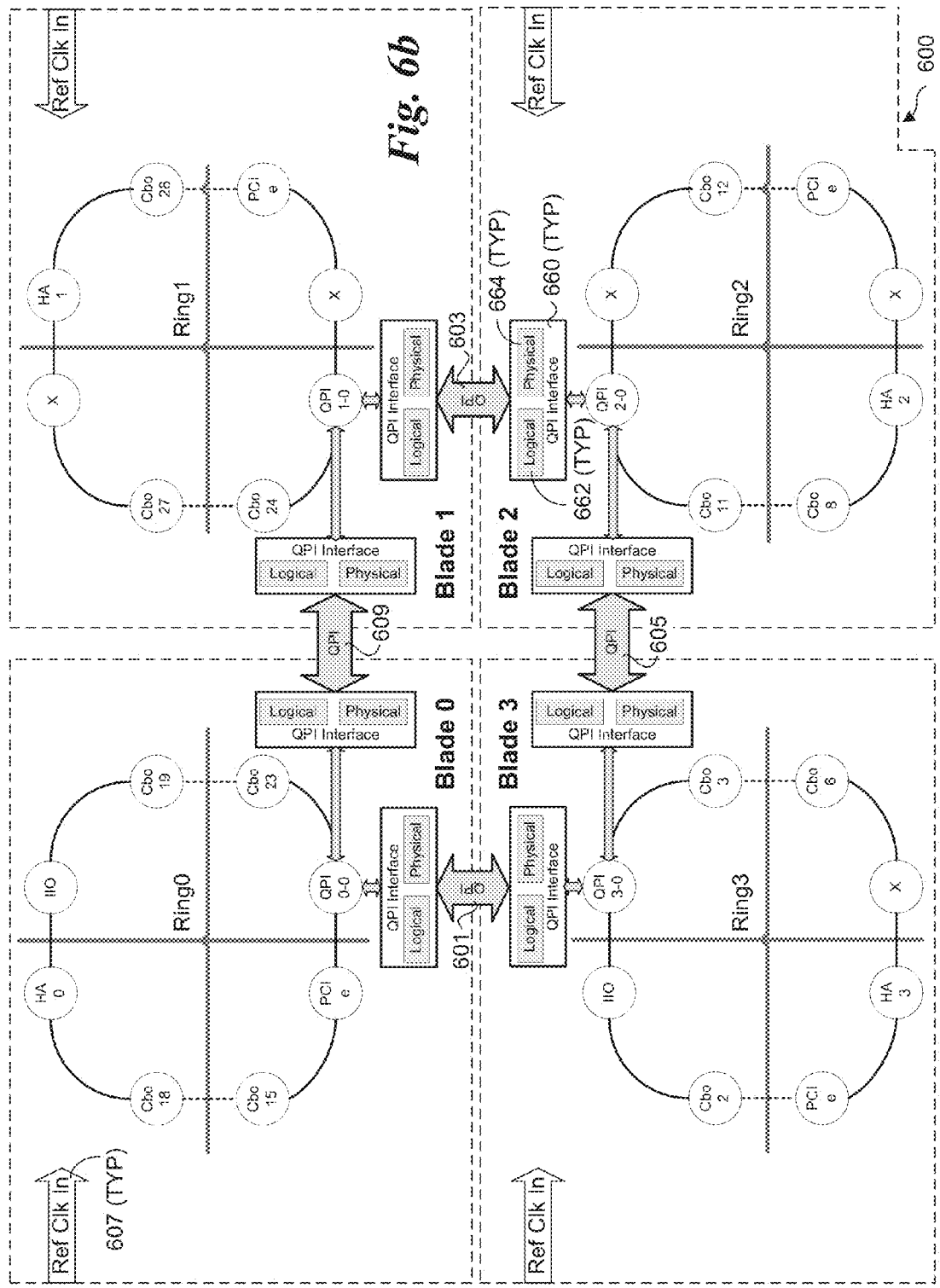
FIG. 6b is a schematic block diagram illustrating further details of the system architecture in FIG. 6.

System architecture 600 also shows two additional QPI Agents 0-1 and 1-1, each corresponding to QPI nodes on rings of CPUs installed into corresponding interposers and sockets on server blades 0 and 1 (both rings and nodes not shown). As before, each QPI agent includes an ingress and egress buffer, shown as ingress buffers 632 and 634, and egress buffers 636 and 638. Further details of system architecture 600 and a system architecture 600a showing all four Rings0-3 are shown in FIGS. 6a-c.

System architecture 600 further depicts three blade-to-blade QPI links 601, 603, and 605, as well as external common reference clock signals 607. There is also a similar blade-to-blade QPI link between Blade 0 and Blade 1 that is not shown in FIG. 6 (see FIGS. 6a-c for details of these QPI links). As described above, a server blade or rack server may be configured to employ an external reference clock signal rather than an on-board generated reference clock signal as the reference clock signal for the blade or server. As a result, when multiple blades or servers employ synchronized external reference clock signals (such as supplied by clock synthesizer board 500 of FIG. 5), the QPI timing at opposing ends of the blade-to-blade QPI links 601, 603, and 605 is also synchronized, enabling messages compliant with the QPI protocol and physical layer to be transmitted over these QPI links.

In the context of maintaining cache coherence in a multi-processor (or multi-core) environment, various mechanisms are employed to assure that data does not get corrupted. For example, in system architecture 600, each of processor cores 602 corresponding to a given CPU is provided access to a shared memory store associated with that CPU, as depicted by memory stores 640-3 or 640-2, which typically will comprise one or more banks of dynamic random access memory (DRAM). For simplicity, the memory interface circuitry for facilitating connection to the shared memory store is not shown; rather, the processor cores in each of Ring2 and Ring3 are shown respectively connected to the memory store via a home agent node 2 (HA 2) and a home agent node 3 (HA 3). In addition, the memory interface circuitry may generally include an on-chip memory controller or an off-chip (i.e., external to the CPU SoC die) memory controller coupled to off-chip memory. Also, the DRAM memory itself is off-chip.

As each of the processor cores executes its respective code, various memory accesses will be performed. As is well known, modern processors employ one or more levels of memory cache to store cached memory lines closer to the cores, thus enabling faster access to such memory. However, this entails copying memory from the shared (i.e., main) memory store to a local cache, meaning multiple copies of the same memory line may be present in the system. To maintain memory integrity, a cache coherency protocol is employed. Under the well-known MESI cache coherency protocol, when a processor (or core) makes a first copy of a memory line from main memory to its local cache, a mechanism is employed to mark the cache line as Exclusive (E), such that another core attempting to access the same memory line knows it does not have exclusive access to the memory line. If two or more cores have copies of the same cache line and the data in the line has not been changed (i.e., the data in the caches is the same as the line in main memory), the cache lines are in a shared (S) state. Once a change is made to the data in a local cache, the line is marked as modified (M) for that cache; and the other copies of the line are marked as Invalid (I), since they no longer reflect the changed state of data for the line. The state returns to Exclusive once the value in the modified cache line is written back to main memory.

Recently, Intel® Corporation introduced a new Forward or "F" state added to a modified MESI cache coherency protocol called the MESIF cache coherency protocol. The F state indicates that a cache should act as a designated responder for any requests for the given line. In a system of caches employing the MESI protocol, a cache line request that is received by multiple caches holding a line in the S state will receive multiple responses. In a system of caches employing the MESIF protocol, however, a cache line request will be responded to only by the cache holding the line in the F state.

It is noted that the MESI and MESIF protocols are examples of cache coherency protocols, and accordingly these are not to be limiting, but are used herein to explain the use of exemplary message classes that correspond to messages that are transferred around rings and across server blades and rack servers in accordance with the architectures disclosed herein.

It is also common to have multiple levels of caches, with caches closest to the processor core having the least latency and smallest size, and the caches farther away being larger but having more latency. For example, a typical configuration might employ first and second level caches, commonly referred to as L1 and L2 caches. Another common configuration may further employ a third level or L3 cache.

In the context of system architecture 600, the highest level cache is termed as the Last Level Cache, or LLC. For example, the LLC for a given core may typically comprise an L3-type cache if L1 and L2 caches are also employed, or an L2-type cache if the only other cache is an L1 cache. Of course, this could be extended to further levels of cache, with the LLC corresponding to the last (i.e. highest) level of cache.

In the illustrated configuration of FIG. 6, each processor core 602 includes a processing engine 642 coupled to an L1 or L1/L2 cache 644, which are "private" to that core. Meanwhile, each processor core is also co-located with a "slice" of a distributed LLC 646, wherein each of the other cores has access to all of the distributed slices. Under one embodiment, the distributed LLC is physically distributed among N cores using N blocks divided by corresponding address ranges. Under this distribution scheme, all N cores communicate with all N LLC slices, using an address hash to find the "home" slice for any given address. Suitable interconnect circuitry is employed for facilitating communication between the cores and the slices; however, such circuitry is not show in FIG. 6 for simplicity and clarity.

As further illustrated, each of nodes 604 in system 600 is associated with a cache agent 648, which is configured to perform messaging relating to signal and data initiation and reception in connection with a cache coherent protocol implemented by the system, wherein each cache agent 648 handles cache-related operations corresponding to addresses mapped to its collocated LLC 646. In addition, in one embodiment each of home agents HA2 and HA3 employs respective cache filters 650 and 652, and the various caching and home agents access and update cache line usage data stored in a respective directory 654-2 and 654-3 that is implemented in a portion of shared memory 640-2 and 640-3. It will be recognized by those skilled in the art that other techniques may be used for maintaining information pertaining to cache line usage.

FIG. 6a shows a system architecture 600a depicting further details of the CPU's configured to be installed in Blades 0 and 1, along with details of a fourth CPU blade-to-blade QPI link 609 and associated QPI agents and buffers. Various details of each of Ring2 and Ring3 have been removed (in comparison with FIG. 6) in order to show four internal ring interconnects (Ring0, Ring1, Ring2 and Ring3) in the same drawing Figure; however, it will be understood that each of Ring0 and Ring1 may have similar components as Ring2 and Ring3 depicted in FIG. 6. As before, each of Ring0 and Ring1 include nodes labeled Cbo n (such as Cbo 18 and Cbo 23 in Ring0 and Cbo 24 and 28 in Ring2) to which associated processor cores and related cache components are coupled, including L1, L2, and LLC caches with corresponding agents. Also, each of Ring0 and Ring1 includes respective home agents HA 0 and HA 1 that are implemented to support coherent memory operations in the manner discussed herein.

The configuration of CPU blade-to-blade QPI link 609 is similar to the CPU blade-to-blade QPI links 601, 603, and 605 shown in FIG. 6 and discussed above. In this instance, the CPU blade-to-blade QPI link supports transfer of QPI signals between QPI node 0-1 on Ring0 and CPI node 1-0 on Ring1, as depicted by QPI agents 0-0 and 1-0, ingress buffers 656 and 658, and egress buffers 660 and 662.

It is noted that in the system architecture 600a, the set of QPI agents and interfaces for a given blade are operatively coupled to separate QPI nodes, rather than a common QPI node. This is an alternative configuration to using single QPI node operatively coupled to two QPI agents. FIG. 6a further shows dashed ellipses in which pairs of QPI nodes are enclosed (e.g., QPI nodes 0-0 and 0-1, 1-0 and 1-1, etc.). This is to illustrate that although depicted as separate nodes for illustrative purposes, these nodes may actually be implemented as a single node, similar to that shown in FIG. 6.

Components relating to the blade-to-blade QPI links are more clearly shown in FIG. 6b, which depicts an abstracted view of system 600, and in FIG. 6c, which depicts an abstracted view of system 600a. As can be seen, blade-to-blade QPI links 601, 603, 605, and 609 link the internal ring interconnects Ring0, Ring1, Ring2, and Ring3 such that the combination of the blade-to-blade QPI links and the internal rings of the CPU's form a larger ring interconnect structure. Under this approach, nodes within a given CPU are enabled to communicate with nodes in any of the other CPU's using a common protocol, which in this example is QPI.

FIGS. 6b and 6c further show a plurality of QPI interfaces 660, each including a logical block 662 and a physical block 664. The logical blocks 662 represent circuitry and logic to support the interface, including a QPI agent. Meanwhile physical blocks 664 represent the physical connection at the end of the links, such as applicable connectors and wiring. In addition, physical blocks 664 may further represent electrical-to-optical interfaces or wired cable interfaces, as applicable to the particular configuration that is implemented.

Exemplary Implementation of Maintaining Cache Coherency Between Memory Stores on Separate Blades Accessed Via Blade-to-Blade QPI Links One of the inherent features of QPI is support for coherent memory transactions. This is implemented via corresponding messages in connection with memory transactions that are handled by the upper layers of the QPI protocol. The messages are communicated to applicable agents using packets, as defined by the QPI protocol layer. The following message classes shown in TABLE 1 are employed by the QPI protocol.

TABLE 1

| Name | Abbr | Ordering | Data Payload |
|---|---|---|---|
| Snoop | SNP | None | No |
| Home | HOM | Required for address | No |
| Non-data Response | NDR | None | No |
| Data Response | DRS | None | Yes |
| Non-coherent Standard | NCS | None | No |
| Non-coherent Bypass | NCB | None | Yes |

The requests and response messages affect either the coherent system memory space or are used for non-coherent transactions (such as configuration, memory-mapped I/O, interrupts, and messages between agents).

The system's cache coherency across distributed caches and integrated memory controllers is maintained by the distributed agents that participate in the coherent memory space transactions, subject to the rules defined by the protocol layer. The QPI coherency protocol allows both home snoop and source snoop behaviors. Home snoop behavior is optimized for greater scalability, whereas source snoop is optimized for lower latency. The latter is used primarily in smaller scale systems where the smaller number of agents creates a relatively low amount of snoop traffic. Larger systems with more snoop agents could develop a significant amount of snoop traffic and hence would benefit from a home snoop mode of operation. As part of the coherence scheme, the QPI protocol implements the well-known MESI (Modified, Exclusive, Shared, and Invalid) protocol and, optionally, introduces a new F- (Forward) state.

In one embodiment, the QPI protocol implements a modified format of the MESI coherence protocol. The standard MESI protocol maintains every cache line in one of four states: modified, exclusive, shared, or invalid. A new read-only forward state has also been introduced to enable cache-to-cache clean line forwarding. Characteristics of these states are summarized in TABLE 2 below. Only one agent can have a line in this F-state at any given time; the other agents can have S-state copies. Even when a cache line has been forwarded in this state, the home agent still needs to respond with a completion to allow retirement of the resources tracking the transaction. However, cache-to-cache transfers offer a low-latency path for returning data other than that from the home agent's memory.

TABLE 2

| State | Clean/ Dirty | May Write? | May Forward? | May Transition To? |
|---|---|---|---|---|
| M—Modified | Dirty | Yes | Yes | — |
| E—Exclusive | Clean | Yes | Yes | MSIF |
| S—Shared | Clean | No | No | I |
| I—Invalid | — | No | No | — |
| F—Forward | Clean | No | Yes | SI |

The QPI coherency protocol consists of two distinct types of agents: caching agents and home agents. A processor will typically have both types of agents and possibly multiple agents of each type.

A caching agent represents an entity which may initiate transactions into coherent memory, and which may retain copies in its own cache structure. The caching agent is defined by the messages it may sink and source according to the behaviors defined in the cache coherence protocol. A caching agent can also provide copies of the coherent memory contents to other caching agents.

A home agent represents an entity which services coherent transactions, including handshaking as necessary with caching agents. A home agent supervises a portion of the coherent memory. Home agent logic is not specifically the memory controller circuits for main memory, but rather the additional QPI logic which maintains the coherency for a given address space. It is responsible for managing the conflicts that might arise among the different caching agents. It provides the appropriate data and ownership responses as required by a given transaction's flow.

In accordance with one embodiment, coherent memory transactions are supported via use of the QPI protocol over blade-to-blade QPI links. For example, a coherent memory scheme may be implemented across blades such that caching agents in the various CPU's may access memory from memory stores in both the caching agent's CPU and other CPU's on different blades while maintaining memory coherency.

Home Snoop Example

Figure 7:
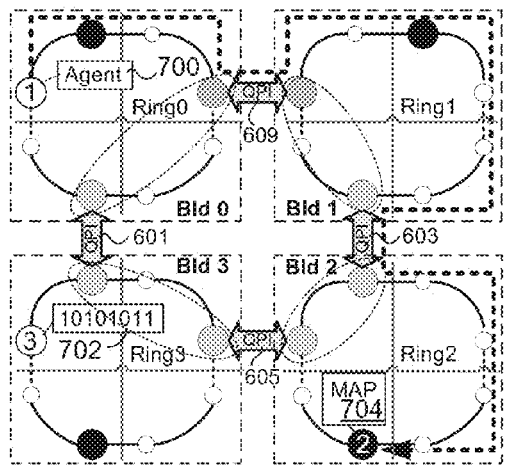
FIG. 7 is a schematic block and message flow diagram illustrating a home snoop memory coherency scheme implemented across four server blades, according to one embodiment.
Figure 7:
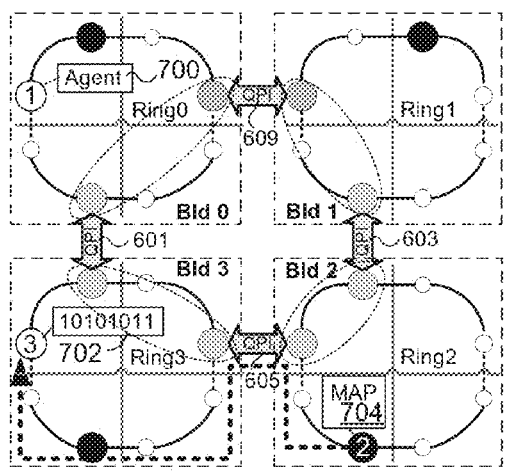
Figure 7:
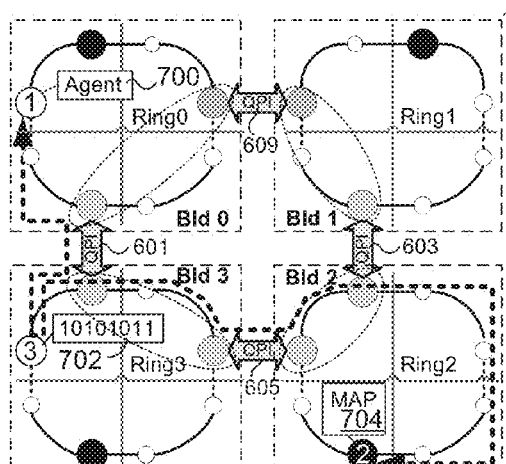
Figure 7:
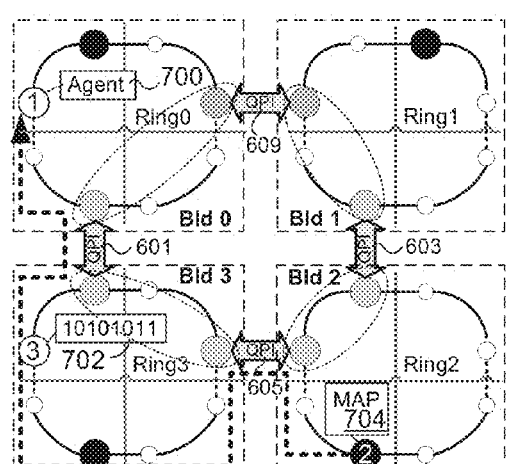

The home snoop coherency behavior defines the home agent as responsible for the snooping of other caching agents. The basic flow for a message involves up to four operations, as illustrated in the example of FIG. 7, wherein the rings shown correspond to the ring interconnects Ring0, Ring1, Ring2 and Ring3 in corresponding processors (CPU's) shown in system architecture 600a. In this example, a simplified read request to an address managed by a remote agent is performed, where an agent 700 is the requesting caching agent coupled to a node 1 in Ring0, Ring1 and Ring3 include one or more peer caching agents, and Ring2 includes a home agent 2 that is the home agent for the cache line. In addition, an agent at node 3 in Ring3 has a copy of the cache line 702 in either an M, E, or F-state.

In a first operation, the caching agent 700 issues a request to home agent 2 that manages the memory in question. In general, each processor will manage a corresponding portion of shared memory, typically via address range mapping or the like. Meanwhile, each home agent maintains a directory structure (depicted as a map 704) that is used to track which agents are holding cache lines corresponding to memory the home agent manages. Also, each of the caching agents will maintain a memory map identifying which home agent is associated with which memory range or ranges. In addition, each processor will typically include facilities for abstracting the physical memory map from the logical memory map presented to the operating system to support functionality such as memory mirroring, memory re-mapping (e.g., in view of detected memory errors).

Next, in a second operation, home agent 2 checks its directory structure to target a snoop to the caching agent identified as holding a cache line corresponding to the memory address in the request. In this example, the directory structure in map 704 indicates that agent 3 holds the cache line, and thus home agent 2 sends a snoop request to agent 3.

In response to the snoop request, caching agent 3 sends a response back to home agent 2 with the status of the address in a third operation. In this example, agent 3 has a copy of the cache line 702 in the proper state, and so it delivers a copy of the cache line data to agent 1. Agent 3 also responds to home agent 2 indicating that it has sent the data to agent 1. The home agent resolves any conflicts, and if necessary, returns the data to the original requesting cache agent (after first checking to see if data was delivered by another caching agent, which in this case it was), and the transaction is completed. This is shown in a fourth operation, wherein home agent 2 provides a message to agent 1 indicating the transaction is complete.

The QPI home snoop behavior implementation typically includes a directory structure to target the snoop to the specific caching agents that may have a copy of the data. This has the effect of reducing the number of snoops and snoop responses that the home agent has to deal with on the interconnect fabric. This is very useful in systems that have a large number of agents, although it comes at the expense of latency and complexity. Therefore, home snoop is targeted at systems optimized for a large number of agents.

Data is transferred between entities using a combination of ring segments in Rings 0-3, and blade-to-blade QPI links 601, 603, 605, and 609. In the examples illustrated in FIG. 7, all transfers (depicted by wide dotted lines with an arrow pointing to the receiving entity) are shown traversing the rings and QPI links in a clockwise manner. However, this is merely for illustrative purposes, as rings may be traversed in both clockwise and counterclockwise directions, and a given data transfer may include a traversal of one ring in one direction and traversal of other rings in the opposite direction.

For example, during the first operation, a data transfer is made from node 1 in Ring0 to home agent 2 in Ring2. This illustrated traversal begins at node 1 and traverses Ring0 in the clockwise direction until it reaches QPI node 0-1 (see the more detailed view shown in FIG. 6c), which is the egress point for transfer to QPI node 1-0 via blade-to-blade QPI link 609. The transfer is then routed around Ring1 in the clockwise direction until it reaches QPI node 1-1, at which point it crosses to the CPU in blade 2 (corresponding to Ring2) via blade-to-blade QPI link 603. The transfer then is routed clockwise around Ring2 until it reaches home agent 2. The other data transfers are illustrated in a similar manner.

PCIe Blade-to-Blade Interconnect Links Using Common Reference Clock

In addition to support for blade-to-blade and server-to-server QPI interconnect links, the common reference clock scheme may also be implemented for other types of interconnect links that may be configured to use common reference clocks. Generally, these may include high-speed serial interconnects currently existing, future versions of such links, or future serial interconnect links that do not currently exist. One such example is PCIe (Peripheral Component Interconnect Express) links.

As with QPI, PCIe supports a point-to-point interconnect using serial links made up of one or more lanes for each of transmitting and receiving. A PCIe link has at least one lane—each lane represents a set of differential signal pairs (one pair for transmission, one pair for reception). To scale bandwidth, a link may aggregate multiple lanes denoted by xN where N may be any of the supported link widths. For example, as of the PCIe 3.0 specification, PCIe links include operations for ×1, ×2, ×4, ×8, ×12, ×16, and ×32 lane widths. During hardware initialization, each PCI Express link is set up following a negotiation of lane widths and frequency of operation by the two agents at each end of the link.

Figure 8:
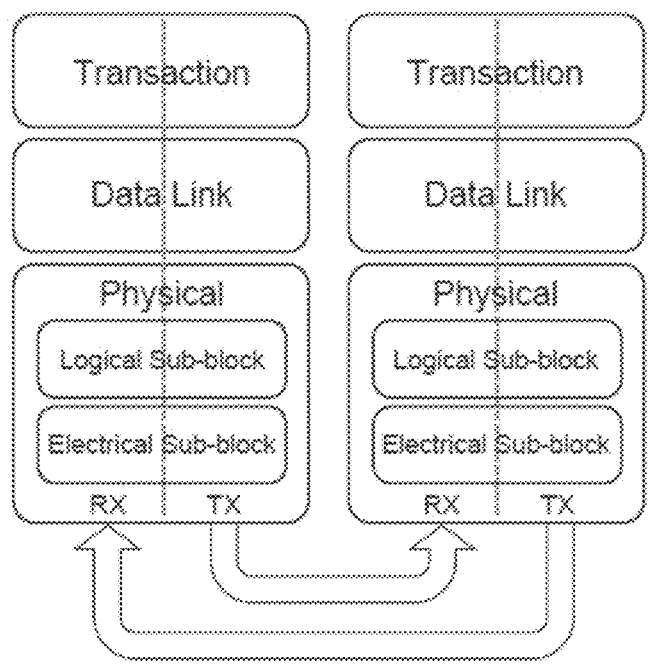
FIG. 8 is a diagram illustrating the layers of the PCIe protocol.

As shown in FIG. 8. PCIe uses a layered protocol, including a Physical Layer, Data Link Layer and Transaction Layer. The Physical Layer further includes a Logical Sub-block and an Electrical Sub-block. PCIe uses packets to communicate information between components. Packets are formed in the Transaction and Data Link Layers to carry the information from the transmitting component to the receiving component. As the transmitted packets flow through the other layers, they are extended with additional information necessary to handle packets at those layers. At the receiving side the reverse process occurs and packets get transformed from their Physical Layer representation to the Data Link Layer representation and finally (for Transaction Layer Packets) to the form that can be processed by the Transaction Layer of the receiving device.

Figure 10:
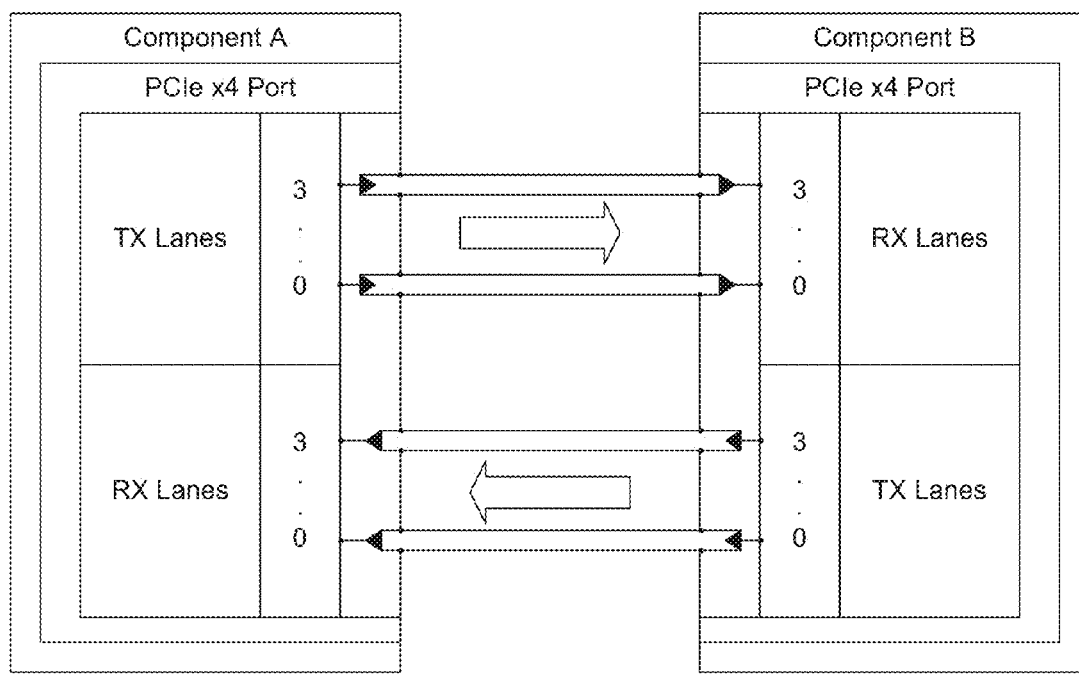
FIG. 10 is a schematic diagram illustrating the structure of an ×4 PCIe link.
Figure 9:
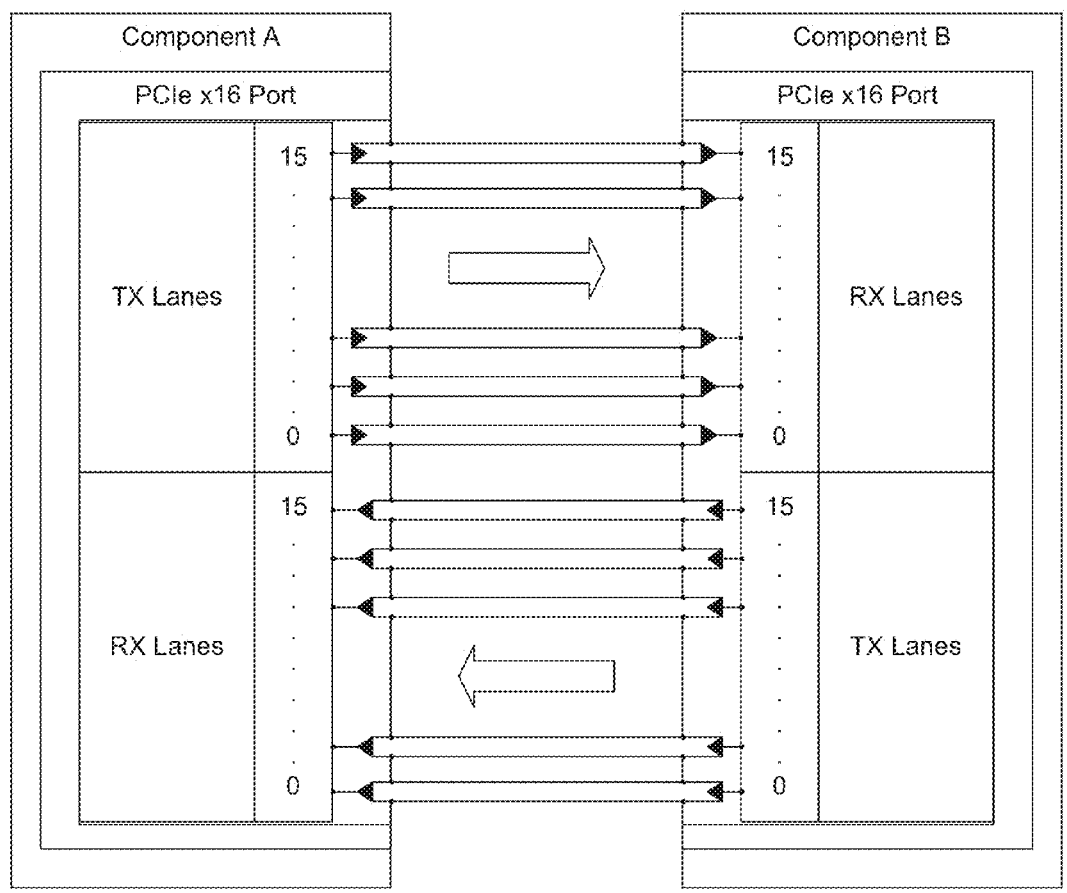
FIG. 9 is a schematic diagram illustrating the structure of an ×16 PCIe link.

While there are some similarities between the QPI PHY and the PCIe PHY, there are also differences. Among these differences are the link configurations and data encoding. FIG. 9 shows the physical connectivity of a PCIe ×16 link. As identified by "×16," this link employs 16 lanes, each comprising a differential signal pair. A PCIe interconnect having circuitry to support an ×16 link may also be configured as two ×8 links. Additionally, the width of an ×16 link may be automatically reduced to an ×8 link, or even an ×4 link in response to detection of errors. FIG. 10 shows in example of a PCIe ×4 link employing four lanes 0-3.

With respect to reference clocking, PCIe link can employ separate reference clocks at each port of the PCIe interfaces. However, PCIe link performance (e.g., EMI) and robustness can be enhanced by employing common reference clocks at the PCIe interfaces of a PCIe link. This approach is implemented in the PCIe embodiments discussed herein.

Figure 5A:
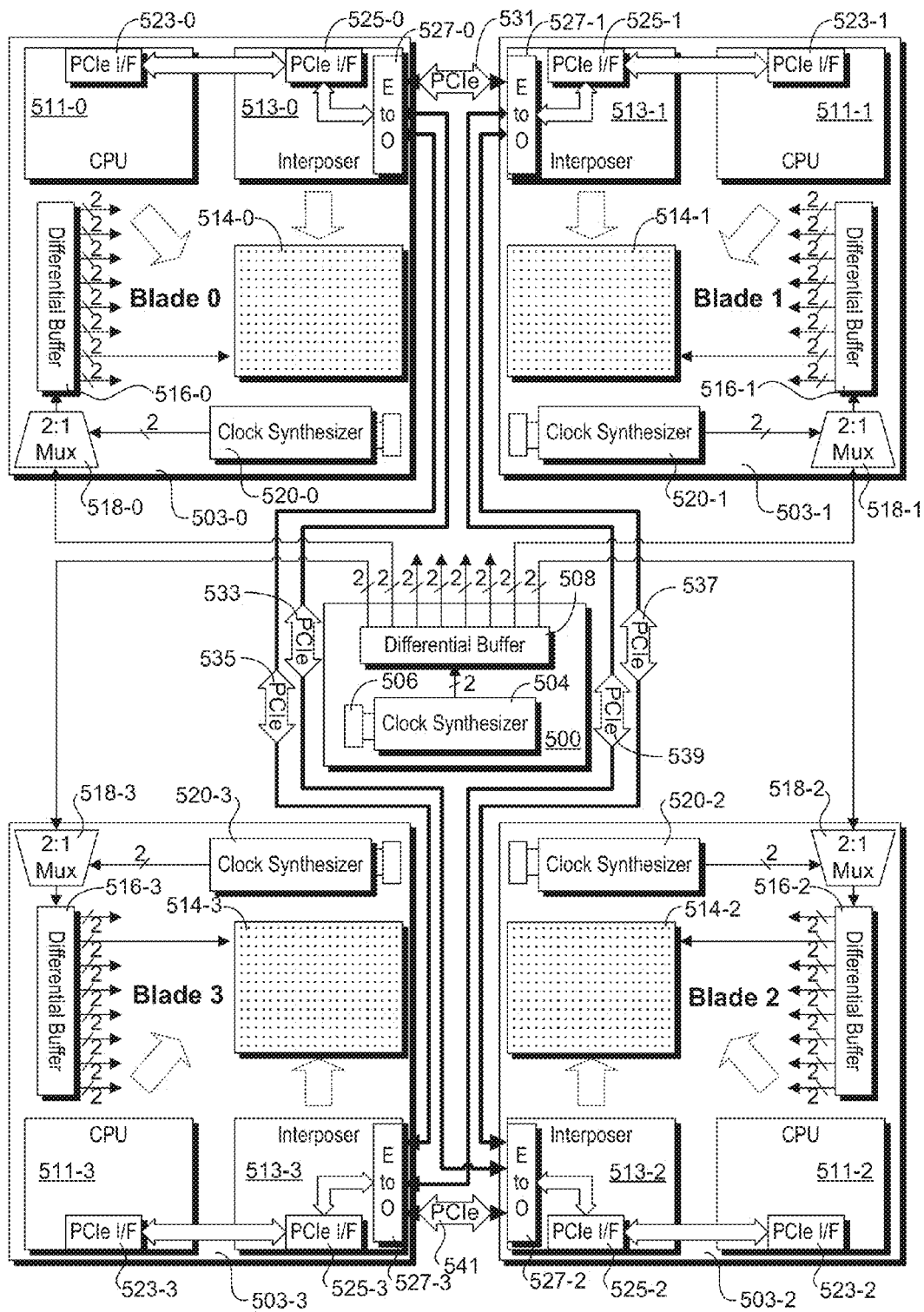
FIG. 5a is a schematic block diagram illustrating one embodiment of a PCIe blade-to-blade interconnect implementation using a clock synthesizer board that supplies common reference clock signals to four server blades.

FIG. 5a shows an exemplary four blade implementation employing blade-to-blade PCIe links between server blades 503-0, 503-1, 503-2 and 503-3 (also labeled Blades 0-3). As with the blade-to-blade QPI link configuration of FIG. 5, the configuration in FIG. 5a employs similar components that share reference numbers in both figures; accordingly, no further description of these components are discussed herein. As before, components sharing the same base reference numbers represent similar components.

With respect to a comparison of blade 502-0 in FIG. 5 and blade 503-0 in FIG. 5a, the different components for blade 503-0 include a CPU 511-0, an interposer 513-0, PCIe interfaces 523-0 and 525-0, and an electrical-to-optical interface 527-0. The components are generally analogous to their counterparts in FIG. 5, except they are now related to PCIe signaling and protocols rather than QPI. FIG. 5a further shows six blade-to-blade PCIe links 531, 533, 535, 537, 539, and 541. As before, this configuration of blade-to-blade PCIe links is merely exemplary. It is noted that each blade shown in FIG. 5a does not necessarily comprise only CPU's and/or interposers. It may also comprise System-on-Chips (SoC's) and/or General-Purpose Graphics Processing Units (GPGPU's), for example, which need PCIe interconnect links in order to be coupled to devices contained in other blades.

A system architecture 600d employing blade-to-blade PCIe links is shown in FIG. 6d. As is readily observed, the configuration of system architecture 600d is similar to system architecture 600a of FIG. 6a, except for the following differences. Each of Rings0-3 includes a pair of PCIe nodes, as shown by PCIe nodes 0-0, 0-1, 1-0, 1-1, 2-0, 2-1, 3-0, and 3-1. Each of these PCIe nodes interfaces to a PCIe agent, as shown by PCIe agents 0-0, 0-1, 1-0, 1-1, 2-0, 2-1, 3-0, and 3-1. Each PCIe agent includes an ingress and egress buffer, as shown by ingress buffers 617, 619, 621, 623, 633, 635, 657, and 659 and egress buffers 625, 627, 629, 631, 637, 639, 661, and 663. Each of Rings0-3 also includes a QPI node. As before, the nodes depicted in system architecture 600d are merely exemplary and the configuration of Rings0-3 are simplified.

The PCIe agents and associated ingress and egress buffers facilitate operation of blade-to-blade PCIe links 611, 613, 615, and 617, which are physically implemented as PCIe electrical or optical cables. Although not shown in FIG. 6d, an appropriate physical interface would also exist at the end of each of the PCIe electrical or optical cables. As discussed above, the lane width of the PCIe links may be ×1, ×2, ×4, ×8, ×12, ×16, or ×32, or a combination of these lane widths.

In the foregoing description and illustrating drawings, the various multi-core CPU's are depicted as employing ring interconnect architectures. However, this is not meant to be limiting, as other type of interconnect architectures may also be used, including but not limited to two-dimensional mesh interconnect fabric architectures. For example, in one embodiment one or more of the CPU's may comprise Single Chip Computers (SCC) with an array of processor cores coupled via an interconnect mesh comprising a Network on a Chip (NoC).

The blade-to-blade and server-to-server link configurations using the external common reference clocking schemes disclosed herein provide substantial advantageous over existing blade and rack server implementations for parallel processing tasks. For example, current configurations are practically limited to two blades employing a QPI link over a mid-plane or backplane, as discussed above. In contrast, much greater scalability can be obtained using the techniques disclosed herein. Moreover, further advantages are provided through use of the QPI links in combination with implementing QPI's inherent support for memory coherence. As a result, shared data objects may be accessed by processors on different blades or servers at the memory or cache level, increasing data access bandwidth significantly over existing approaches that require provisions such as locking data objects and employing network level protocols (e.g., an Ethernet stack) to access data objects on such different blades and servers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A system, comprising:
    a plurality of server blades or servers, each having an external reference clock signal input port and at least one link interconnect interface;
    a clock synthesizer board, configured to generate a plurality of common reference clock signals at a plurality of output connectors;
    a plurality of reference clock signal cables, each coupled between a respective output connector on the clock synthesizer board and an input port on a respective server blade or server; and
    a plurality of interconnect link cables coupled at opposing ends to the link interconnect interfaces and linking the plurality of server blades or servers in communication,
    wherein, during operation of the system, the common reference clock signals are used as interconnect system clock inputs to facilitate communication between the server blades or servers over the plurality of interconnect link cables.

2. The system of claim 1, wherein at least one of the interconnect links comprises a QuickPath Interconnect (QPI) link.

3. The system of claim 1, wherein at least one of the interconnect link comprises a Peripheral Component Interconnect Express (PCIe) link.

4. The system of claim 1, wherein at least one of the plurality of interconnect link cables comprises an optical cable.

5. The system of claim 1, wherein at least one server blade or server includes a main board including a processor socket into which an interposer is installed such that the interposer is interposed between a processor and the socket, the interposer configured to route signals from pins on the processor corresponding to an interconnect link to a cable interface on the interposer to which a interconnect cable is connected.

6. The system of claim 5, wherein the interposer includes an electrical-to-optical interface configured to convert output electrical signals into optical signals, and convert incoming optical signals into electrical signals.

7. The system of claim 1, wherein at least one server blade or server includes a switchable clock input that enables the at least one server blade to employ an external reference clock signal or an on-board reference clock signal.

8. The system of claim 1, wherein a least a portion of the server blades or servers are linked to other server blades or servers via interconnect link cables in a daisy chain configuration under which a given server blade or server is only linked to one or two other server blades or servers via respective interconnect link cables.

9. The system of claim 1, wherein the plurality of reference clock signal cables have substantially equal lengths.

10. A method comprising:
    providing a plurality of substantially synchronized external common reference clock signals to a plurality of server blades or servers;
    employing the common reference clock signals or signals derived therefrom as clock timing signals at opposing ends of serial interconnect links to support communication links between the plurality of server blades or servers; and
    linking the plurality of server blades or servers via the plurality of serial interconnect links in a daisy chain configuration under which a given server blade or server is only linked to one or two other server blades or servers via respective interconnect link cables.

11. The method of claim 10, further comprising employing a clock synthesizer board to generate a plurality of external common reference clock signals and providing the signals from the clock synthesizer board to the plurality of server blades or servers such that a propagation delay between when the signals exit the clock synthesizer board and arrive at the plurality of server blades or servers is substantially equal across the server blades or servers.

12. The method of claim 10, wherein at least one serial interconnect link comprises a QuickPath Interconnect (QPI) link.

13. The method of claim 12, further comprising employing QPI messages over a QPI link to facilitate a coherent memory transaction across first and second server blades or servers linked in communication via the QPI link.

14. The method of claim 10, wherein at least one serial interconnect link comprises a Peripheral Component Interconnect Express (PCIe) link.

15. A server blade comprising:
    an input port for receiving an external common reference clock signal, the input port configured to be coupled to one of a wired or optical cable over which the external common reference clock signal is sent;
    means for generating an internal reference clock signal;
    means for switching between use of the external common reference clock signal and the internal reference clock signal;
    a differential buffer, configured to replicate an input clock signal comprising the external common reference clock signal or the internal reference clock signal and to output a plurality of replicated clock signals;
    a processor, having at least one serial interconnect interface, configured to employ one of the replicated reference clock signals or a reference clock signal derived therefrom for clock timing operations relating to serial interconnect signals sent from and received at the at least one serial interconnect interface; and
    means for coupling serial interconnect signals from the at least one serial interconnect interface to first and second serial interconnect cables used for transmitting data to and receiving data from respective second and third server blades.

16. The server blade of claim 15, further comprising a processor socket into which an interposer is installed such that the interposer is interposed between a processor and the processor socket, the interposer configured to route signals from pins on the processor corresponding to the at least one serial interconnect interface to a cable interface on the interposer, the cable interface configured to couple first and second interconnect cables used to connect the server blade to the respective second and third server blades.

17. The server blade of claim 16, wherein the interposer further comprises an electrical-to-optical interface configured to convert outgoing electrical signals into optical signals, and convert incoming optical signals into electrical signals.

18. The server blade of claim 15, wherein the serial interconnect comprises a QuickPath Interconnect (QPI) interconnect.

19. The server blade of claim 18, wherein the processor is configured to employ QPI messages to facilitate coherent memory transactions accessing data stored in at least one of memory or cache on the second server blade.

* * * * *